United States Patent [19]

Blumrich et al.

[11] Patent Number: 5,215,953

[45] Date of Patent: Jun. 1, 1993

[54] CATALYST FOR THE OXIDATION OF SULFUR DIOXIDE AND METHOD FOR THE PRODUCTION OF THE CATALYST

[75] Inventors: Stephan Blumrich, Bruchköbel; Wolfgang Honnen, Kusterdingen-Jettenburg; Bernd Engler, Hanau; Edgar Koberstein, Alzenau, all of Fed. Rep. of Germany

[73] Assignee: Degussa Aktiengesellschaft, Frankfurt am Main, Fed. Rep. of Germany

[21] Appl. No.: 925,803

[22] Filed: Jul. 22, 1992

Related U.S. Application Data

[63] Continuation of Ser. No. 710,201, Jun. 6, 1991, abandoned.

[30] Foreign Application Priority Data

Jun. 8, 1990 [DE] Fed. Rep. of Germany ....... 4018324

[51] Int. Cl.$^5$ .................. B01J 21/02; B01J 21/06; B01J 23/22; B01J 27/055
[52] U.S. Cl. .................. 502/218; 502/242; 502/344
[58] Field of Search .............. 502/218, 242, 344; 423/535

[56] References Cited

U.S. PATENT DOCUMENTS

| | | | |
|---|---|---|---|
| 4,744,967 | 5/1988 | Brand et al. | 423/239 |
| 4,931,418 | 6/1990 | Cullo et al. | 502/218 |

FOREIGN PATENT DOCUMENTS

| | | |
|---|---|---|
| 0264747 | 4/1988 | European Pat. Off. . |
| 0336882 | 10/1989 | European Pat. Off. . |
| 0385958 | 9/1990 | European Pat. Off. . |
| 1086218 | 8/1960 | Fed. Rep. of Germany . |
| 3910249 | 10/1989 | Fed. Rep. of Germany . |
| 1314260 | 11/1962 | France .................. 502/242 |
| 2263817 | 3/1975 | France . |

OTHER PUBLICATIONS

J. Sagoschen, "Platinmetalle als Katalysatoren-Eine Uebersicht" *Metall*, vol. 12, Jahrgang, Jul. 1958, Heft 7, pp. 604-611.

*Primary Examiner*—W. J. Shine
*Attorney, Agent, or Firm*—Beveridge, DeGrandi, Weilacher & Young

[57] ABSTRACT

A solid catalyst for the oxidation of sulfur dioxide in gas currents containing oxygen, which catalyst includes vanadium oxide and alkali metal oxides, alkali metal sulfates or mixtures thereof, as an active substance, silicon, aluminum, or mixtures thereof, in oxide form, for surface area enlargement, and titanium dioxide in anatase form, rutile form, or mixtures thereof, as a carrier material and a ceramic binder. The metals in these finely sintered components which impart discrete functions are present in certain atomic ratios. The fine sintering takes place according to a production method especially by means of differentiated conditions of drying, calcining and sintering. One use for the invention is the desulfurization of waste gases from combustion processes and industrial plants.

16 Claims, 5 Drawing Sheets

• EXAMPLE 3  + EXAMPLE 4
* EXAMPLE 5  □ EXAMPLE 6

CATALYST FOR THE OXIDATION OF SULFUR DIOXIDE AND METHOD FOR THE PRODUCTION OF THE CATALYST

RELATED APPLICATION DATA

This application is a continuation of U.S. patent application Ser. No. 07/710,201, filed Jun. 6, 1991, now abandoned.

BACKGROUND OF THE INVENTION

This invention relates to a catalyst for the oxidation of sulfur dioxide contained in an oxygen-containing gas current. The catalyst includes the following components:

- $A_1$) Vanadium oxide; and
- $A_2$) Alkali metal oxide, alkali metal sulfate or mixtures thereof, as a catalytically active substance; and
- B) Silicon, aluminum, or mixtures thereof, in the form of oxides as a surface area enlarging component.

In addition to street traffic, waste gases from combustion processes and industrial plants also constitute a source of the existing environmental pollution. The waste gases contain air pollutants, such as nitrogen oxides, carbon monoxide, hydrocarbons and sulfur dioxide. These pollutants are well known for their adverse impact on the environment.

If primary measures for the reduction of pollutant emissions have only a minor effect on the total emission of pollutants, then secondary measures, such as catalytic waste-gas cleaning methods, have to be employed.

Most of the combustion processes for fossil fuels takes place with fuel-air compositions which are leaner than stoichiometric. The catalytic waste-gas cleaning methods suitable for this purpose are the well known SCR (selective catalytic reduction) method for denitration by means of ammonia and the use of oxidation catalysts containing noble metals for the oxidation of carbon monoxide, hydrocarbons and also sulfur dioxide. The sulfur dioxide can be further processed to sulfuric acid. A combination of both methods is constituted by the method described in German Patent No. 36 01 378, with which method waste gases can be freed of $NO_x$ and $SO_2$ with the creation of sulfuric acid.

For reasons of production technology, oxidation catalysts containing noble metals are not yet available in the necessary large geometric dimensions. It is still necessary to arrange individual, smaller monoliths over each other in order to obtain the necessary catalytic volume. Since dust settles out of dust-charged waste gases at the joints between adjacent monoliths, a great number of expensive dust blowers must be installed. In addition, the noble-metal component of these catalysts represents a considerable cost factor which can be tolerated in rather small waste-gas cleaning systems, but which results in prohibitive investment costs in rather large systems, such as heating power stations or super-power stations. Finally, the catalytically active noble-metal component is especially sensitive to poisonous components present in flue gas which can deactivate the catalyst.

As already explained, the catalysts for use with dust-charged waste gases are maintained clean by means of soot or dust blowers which swirl the dust deposited on the approach side of the catalysts and at the joints of catalytic packets by means of hot vapor or hot air. The dust is thereby returned to the current of waste gas which entrains it through the catalytic conduits, thus removing it out of the reactor. In order to reduce the number of cost intensive soot-blower devices in a catalytic reactor, it is necessary to have as few approach surfaces and joints as possible in reactors equipped with monolithic and/or honeycomb catalysts. A prerequisite for this is that the monolithic and/or honeycomb bodies should be produced with as great a piece length as possible. However, long monolithic and/or honeycomb bodies can not yet be produced in the case of coating catalysts containing noble metals.

Also, the use of soot or dust blowers functions only in the case of catalysts in monolithic or honeycomb form. Catalysts in bulk form can not be cleaned with the blowers, since the dust would only penetrate into deeper positions in the catalyst. The catalyst would fill with dust and the stoppage would remain. At the same time, there would be the danger of an uncontrolled turbulence of the bulk-material catalyst.

However, the noble-metal catalysts (e.g. platinum) used in the past to convert sulfur dioxide into sulfur trioxide, the anhydride of sulfuric acid, in the so-called contact method or especially base metal oxide catalysts (for example, vanadium pentoxide and alkali sulfate with silicon dioxide as carrier material) have been used exclusively in bulk form (as extruded blanks or rings). For the reasons explained above, this technology was problematic for the treatment of waste gases containing sulfur oxide, especially if the waste gases were charged with dust. Dust deposits had to be removed by means of sieving out the catalyst. The service life of such catalysts was therefore determined primarily by their mechanical strength.

SUMMARY OF THE INVENTION

It is one objective of this invention to produce a catalyst which is suitable for converting sulfur dioxide into sulfur trioxide. The sulfur dioxide may be contained in gas currents which include oxygen, or other components compounded with oxygen, or a gas containing oxygen. The catalyst may be used as a form body suitable as a bulk bed for the treatment of dust-free gas currents and as a monolithic or honeycomb body for use in waste gas and flue gas cleaning systems sensitive to pressure loss and/or in dusty currents of air, waste gas or flue gas. The catalyst should be able to be readily brought into any form customary for bulk-material catalysts, and they should be able to be manufactured as a monolith or honeycomb body. A catalyst formulation was developed to this end in accordance with the invention which is different from that of catalysts previously used for this purpose. The catalysts previously used do not exhibit sufficient wear resistance as a bulk body or could not be processed in a sufficient manner into honeycomb bodies with sufficient strength.

The invention includes a catalyst for the oxidation of sulfur dioxide contained in an oxygen-containing gas current. The catalyst includes the following components:

- $A_1$) Vanadium oxide;
- $A_2$) Alkali metal oxide, alkali metal sulfate or mixtures thereof, as a catalytically active substance; and
- B) Silicon, aluminum, or mixtures thereof, in the form of oxides as surface area enlarging components.

The catalyst is characterized in that it also contains

C) Titanium oxide in anatase form, rutile form or mixtures thereof as a carrier material and ceramic binder.

The catalyst is designed as a solid catalyst, optionally in monolithic or honeycomb form, in which a mixture of components A)-C) is present in a finely sintered form with atomic ratios between the metals of the components according to the following: $A_1$):$A_2$):B):C)=(0.01-0.2):(0.01-0.2):(0.001-0.5):1. Preferably, the atomic ratios are as follows: (0.02-0.08):(0.02-0.08):(0.005-0.05):1.

The oxidation catalyst of the invention meets the following requirements in the designated area of use.

The catalyst is capable of converting more than 90% of the sulfur dioxide in a waste gas to sulfur trioxide in a single method step. The catalyst can be manufactured in the form of monolithic or honeycomb bodies up to a length of 1000 mm, and it fully meets the above requirements for maintaining a clean state when loaded with dusty waste gas or flue gas. The temperature range in which the required conversion is achieved is very broad, and especially includes low temperatures. The kinetic behavior of the catalyst of this invention is considerably improved because the oxidation reaction proceeds in accordance with a time law of the first order, unlike was the case with most of the noble-metal-containing catalysts previously used. In the past, this has resulted in problems in the measuring of the necessary catalytic volume, especially in the case of high conversion requirements. The catalyst is a solid catalyst, that is, it contains catalytically active material through and through, which catalyst active material is exposed again and again by means of abrasion, for example, abrasion by means of the dust contained in the flue gases.

This invention also includes a method for the production of the catalyst. The method is characterized in that components A) through C) are intensively processed to a homogeneous mass in finely divided form with the addition of the additives customary for pressing or extruding ceramic masses, namely, moistening agents, stabilizing medium, green-body binders, auxiliary deformation agents and, optionally, pore forming material. The mass is pressed or extruded to the desired green bodies, preferably to monolithic or honeycomb bodies, the green bodies are dried under a slow elevation of the temperature to at the most about 60° C. with controlled moisture of the ambient air, and are then calcined under gradual (step-by-step) elevation of the temperature in the ambient air to at least 500° C., and at the most 800° C. The calcined bodies are sintered at a temperature in this range for at least 12 hours, preferably 14-48 hours, and especially 18-36 hours.

Desalinated water, aqueous ammonia solution, monoethanol amine and alcohols can be used as moistening agents.

Glass fibers of differing sizes may be used as examples of the stabilizing media.

Cellulose derivatives such as carboxymethylcellulose or also non-substituted celluloses are suitable as binders. The binder should impart sufficient stability to the paste to be produced after the deformation in the state of the so-called green bodies.

In addition, polyethylene, polypropylene, polyvinyl alcohol, polyethylene oxide, polyacrylamide or polystyrene may also be used as binders.

In order to facilitate a pressing, or to improve the extrusion capability, auxiliary deformation and/or lubrication agents, such as bentonites, clays, organic acids, paraffin, waxes, silicone oils may also be added.

Finally, the porosity (pore volume, pore distribution) of the solid catalysts of the invention may also be adjusted in a purposeful manner by means of the addition of suitable pore forming materials. Such substances include, for example, fine carbons (activated carbons) or wood pulp, which burn out at the calcining temperatures to be used.

Advantageously, kneading units can be used for intensive mixing of the initial substances into a homogeneous kneaded mass. Kneaders with blades which are sigma-shaped or which move out in a shearing manner are preferred. Expensive method steps which are technically complicated and damaging to the environment are avoided. Co-precipitation procedures and grinding procedures for preparing an intimate oxide mixture are eliminated. This results in a distinct reduction in the production cost, and at the same time eliminates the dependency on initial materials which are expensive to produce.

A particular advantage of the production method in accordance with this invention is the fact that commercially available oxides and chemically temperature-stable sulfates are exclusively used as initial materials. Therefore, the use of hydroxide precursors or hydrated oxide precursors, which would necessitate additional processing measures, can be eliminated.

In contrast to frequently used denitration catalysts which contain titanium oxide and in which a catalytic action is attributed to this component, in the catalyst of this invention for the oxidation of sulfur dioxide, component C) of this compound exclusively assumes the function of a ceramic carrier and binder for the catalytically active substance A) and for its surface area enlarging additive B).

The alkali-metal oxide or sulfate $A_2$ used as a component of catalytically active substance A) assumes the function of a flux for active substance $A_1$) in the catalytic composition of the invention at an operating temperature of 380°-500° C. $A_1$) and $A_2$) aid the sintering process between binder C) and surface area enlarging additive B) during the sintering of the additives for the catalyst.

It is also within the scope of this invention to use the catalyst of the invention for the oxidation of sulfur dioxide present in a current of air or in a current of flue gas or waste gas containing oxygen.

BRIEF DESCRIPTION OF THE DRAWINGS

The advantageous features of this invention will be more fully realized from the following Detailed Description, especially when considered in view of the attached figures, wherein.

DETAILED DESCRIPTION OF THE INVENTION

The catalyst and process in accordance with this invention will be illustrated in the following Examples.

EXAMPLE 1

The following substances are mixed in a kneading unit with sigma blades and subjected to a kneading process lasting 7 hours:

TABLE 1

| | |
|---|---|
| Titanium oxide (anatase) | 4950 g |
| Silicon dioxide | 146 g |
| Vanadium pentoxide | 297 g |
| Potassium sulfate | 297 g |
| Water | 4542 g |
| Clay | 213 g |
| Glass fibers | 550 g |
| Organic additives | 164 g |
| Ammonia | 1150 g |

The kneaded mass is subsequently extruded in a worm extruder to form bodies, heated with a temperature rise of 1° C. per hour to 50° C. and a relative moisture of approximately 100% to 80%, largely dried thereby and then heated further in stages of a maximum of 50° C. per 2 hours to 600° C. Then, the mixture is tempered by sintering for 24 hours at this temperature in air. The honeycomb bodies have 3×3 cells of a square cross section, a cell width of 5.5 mm and a wall thickness of 1.3 mm.

The activity test was carried out in a laboratory testing system under the following conditions:

TABLE 2

| | | |
|---|---|---|
| V | 1.13 | m³/h (under standard conditions); moist |
| A*) | 16-52 | m/h |
| LV**) | 0.6 | m/s (standard conditions) |
| T | 350-450 | °C. |
| NO | 100 | ppm dry |
| SO₂ | 600 | ppm dry |
| O₂ | 5 | by vol. dry |
| H₂O | 7 | by vol. moist |
| N₂ | remainder | |

*Surface charge (volume flow/catalytic surface)
**Approach speed

Figure 1:
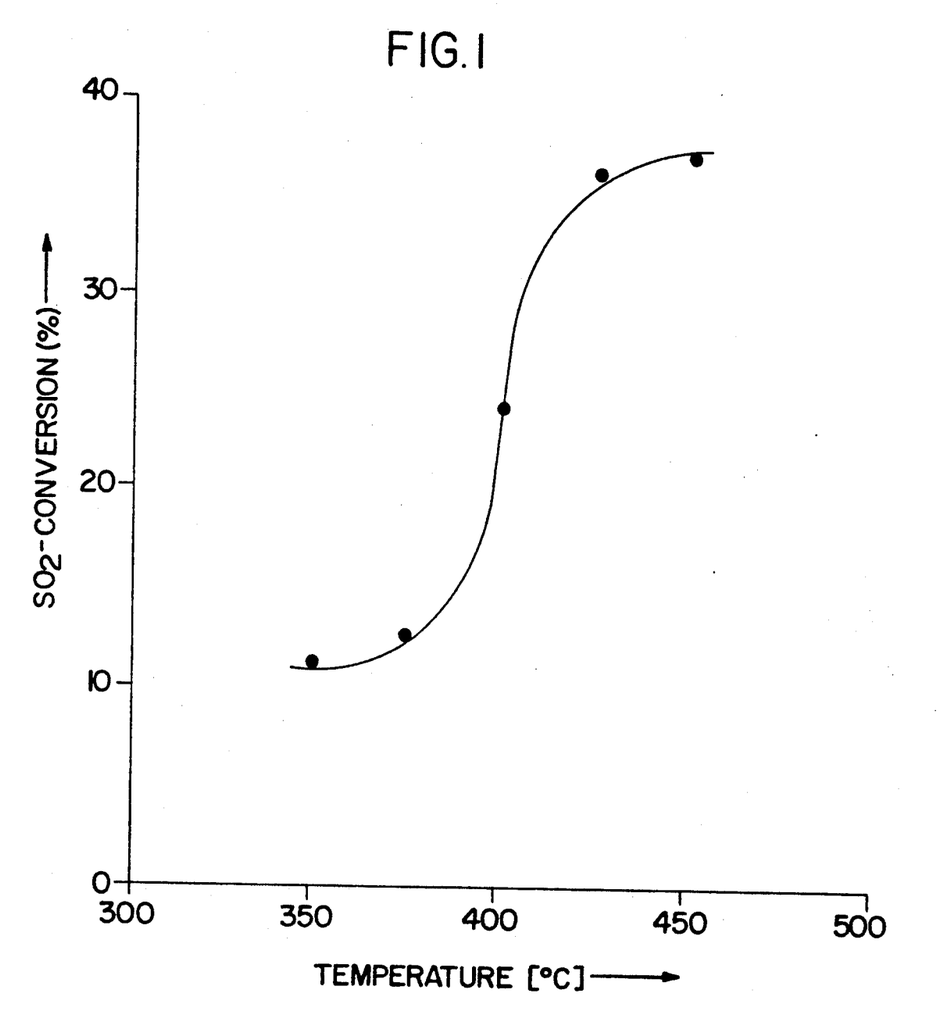
FIG. 1 shows the sulfur dioxide to sulfur trioxide conversion rate as a function of temperature for Example 1.

FIG. 1 shows the temperature dependency of the catalytic activity of this catalyst at a surface charge of $AV = 52$ m/h, which corresponds to a space velocity of approximately 20000 $h^{-1}$. The conversion remains at a rather low level up to 375° C. but then rises sharply in a temperature window of about 50° C. wide and stabilizes after approximately 425° C. at 36–37% conversion.

Figure 2:
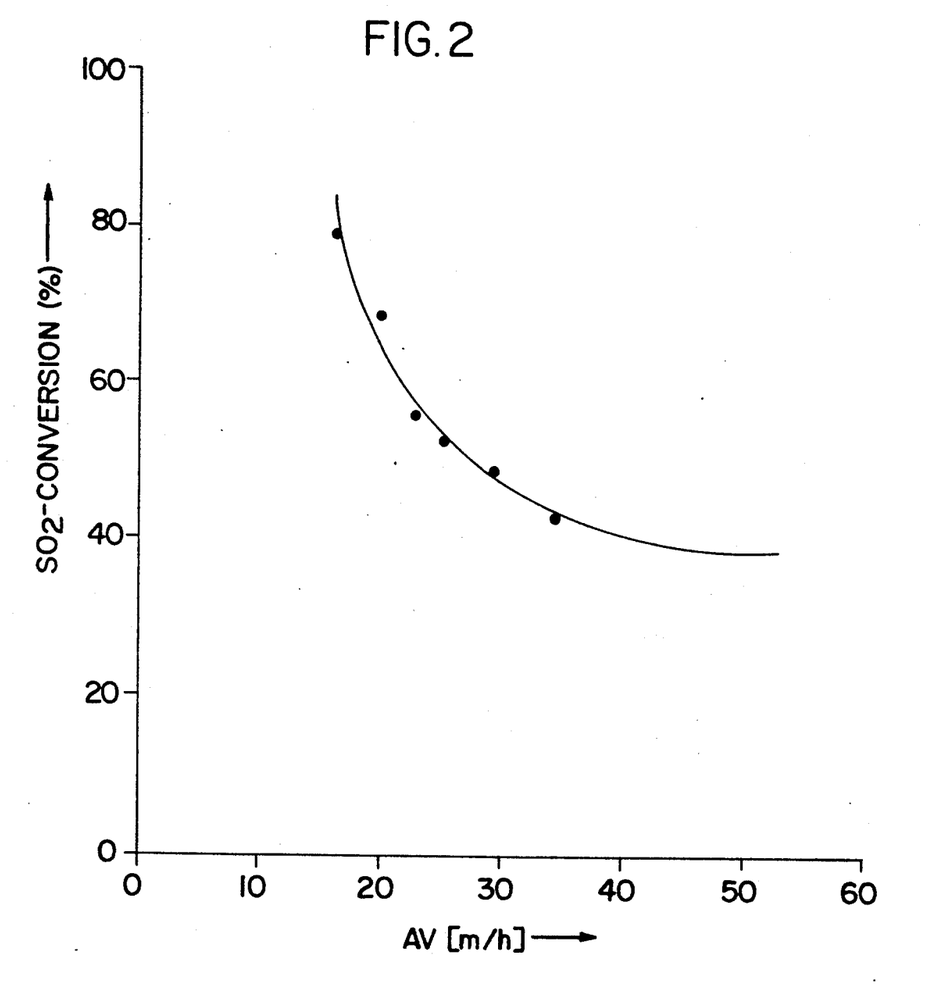
FIG. 2 shows the sulfur dioxide conversion rate as a function of approach speed (AV) for Example 1.

FIG. 2 shows the dependency of the SO₂ conversion on the surface charge of the catalyst at 450° C. The AV value (surface charge) was 16.4 m/h at first in the case of a catalytic honeycomb 350 mm long. By means of sawing off 30 mm at a time, the AV value was increased successively to 52 m/h. The AV range between 4 and 10 m/h, which is of interest for real operation, can not be accomplished in this laboratory testing system; however, conversion values around 80% were found already at $AV = 15$ m/h. Therefore, it can be expected that conversion values above 90% can be reached and even distinctly exceeded in the range of 4–10 m/h.

EXAMPLES 2-6

The following substances are mixed in a kneading unit with blades which move out in a shearing manner and are kneaded for 12 hours to a paste (all data in kg):

TABLE 3

| Component | Example 2 | 3 | 4 | 5 | 6 |
|---|---|---|---|---|---|
| Titanium oxide (Anatase) | 30.0 | 180.0 | 180.0 | 40.0 | 40.0 |
| Silicon dioxide | 0.9 | 2.7 | 2.7 | 1.2 | 1.2 |
| Ammonium Metavanadate | 1.0 | 6.0 | 12.0 | 2.66 | 2.66 |
| Potassium sulfate | 1.5 | 9.0 | 9.0 | 2.0 | 3.0 |
| Water | 16.5 | 100.0 | 100.0 | 20.5 | 20.0 |
| Clay | 1.5 | 9.0 | 9.0 | 2.0 | 2.0 |
| Glass fibers | 3.18 | 19.0 | 19.0 | 4.23 | 4.23 |
| Organic additives | 1.235 | 7.5 | 7.5 | 2.0 | 2.0 |

After kneading, the paste is placed into an extruder and pressed into honeycomb bodies. In Examples 2, 5 and 6, so-called quarter monoliths with 75×75 mm width and 500 mm length were extruded, and in Examples 3 and 4 solid monoliths with 150×150 mm width and 1000 mm length were produced. After drying and calcining, as in Example 1, tests were performed in a pilot plant system after a dry coal firing and also in an industrial-sized system, likewise after a dry coal firing. The composition of the flue gases in both of these systems corresponds within the framework of the customary range of variation to the composition indicated in Example 1, with the difference being that there was still approximately 12 % by volume CO₂ and a dust content of less than 50 mg/m³ present.

For the pilot system, flue gases are drawn off isokinetically after the dedusting and heated by means of electric heaters to the desired temperature. The catalysts are located in a heat-insulated reactor with a total of 12 gas-specimen removal and temperature measuring positions. According to the DESONOX ® method of Degussa AG, the flue gases are denitrified at first according to the SCR method (selective catalytic reduction). Immediately afterward, the catalysts for the reduction of the nitrogen oxides with NH₃ oxidation catalysts of the invention were installed. The catalyst elements produced in accordance with the method of the invention in lengths of 1000 mm or 500 mm with side-edge lengths of 150 mm×150 mm or 75 mm×75 mm were sawed into elements with a length of 150 mm each for reasons of a detailed measurement of the conversion along the reaction stretch of the pilot system. A total of eight such elements were installed in series. The cell division was 4.2 mm.

Figure 3:
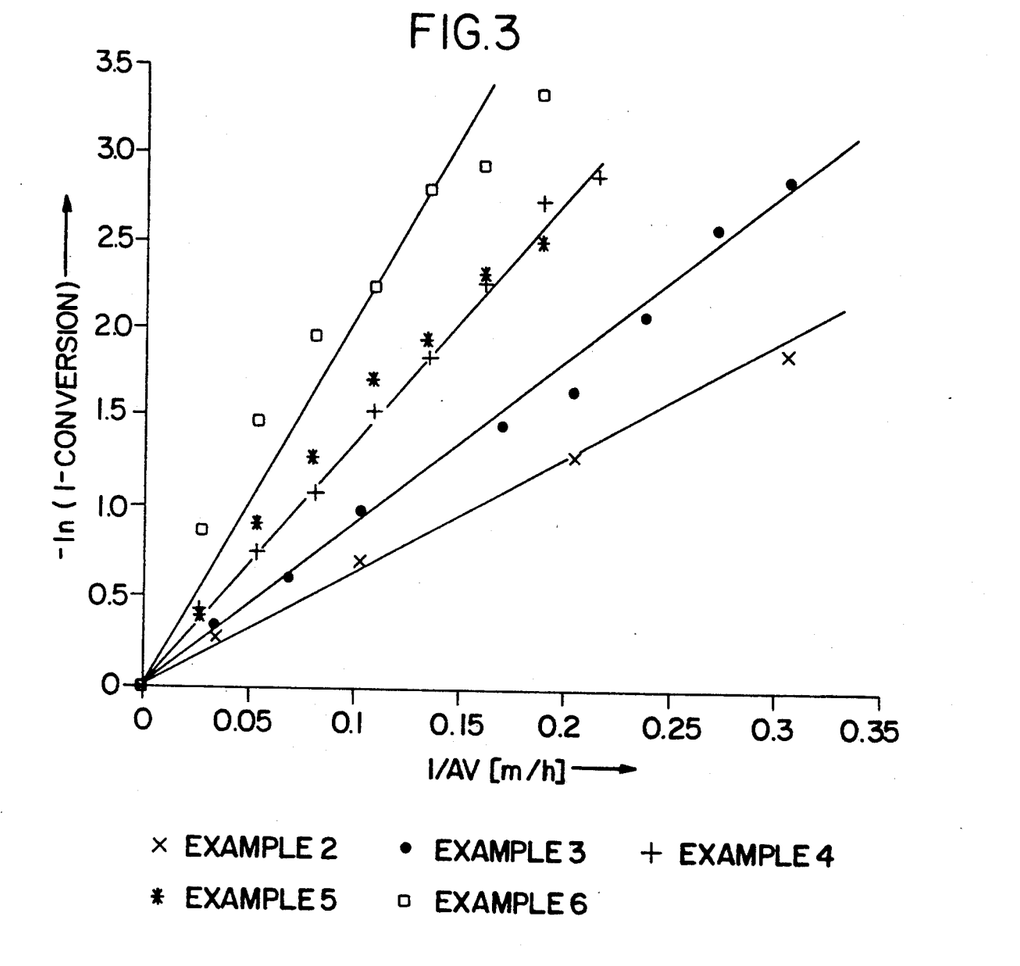
FIG. 3 shows a comparison of the natural log of $(1-SO_2$ conversion) as a function of $(AV)^{-1}$, for Examples 2-6 at 450° C.
Figure 4:
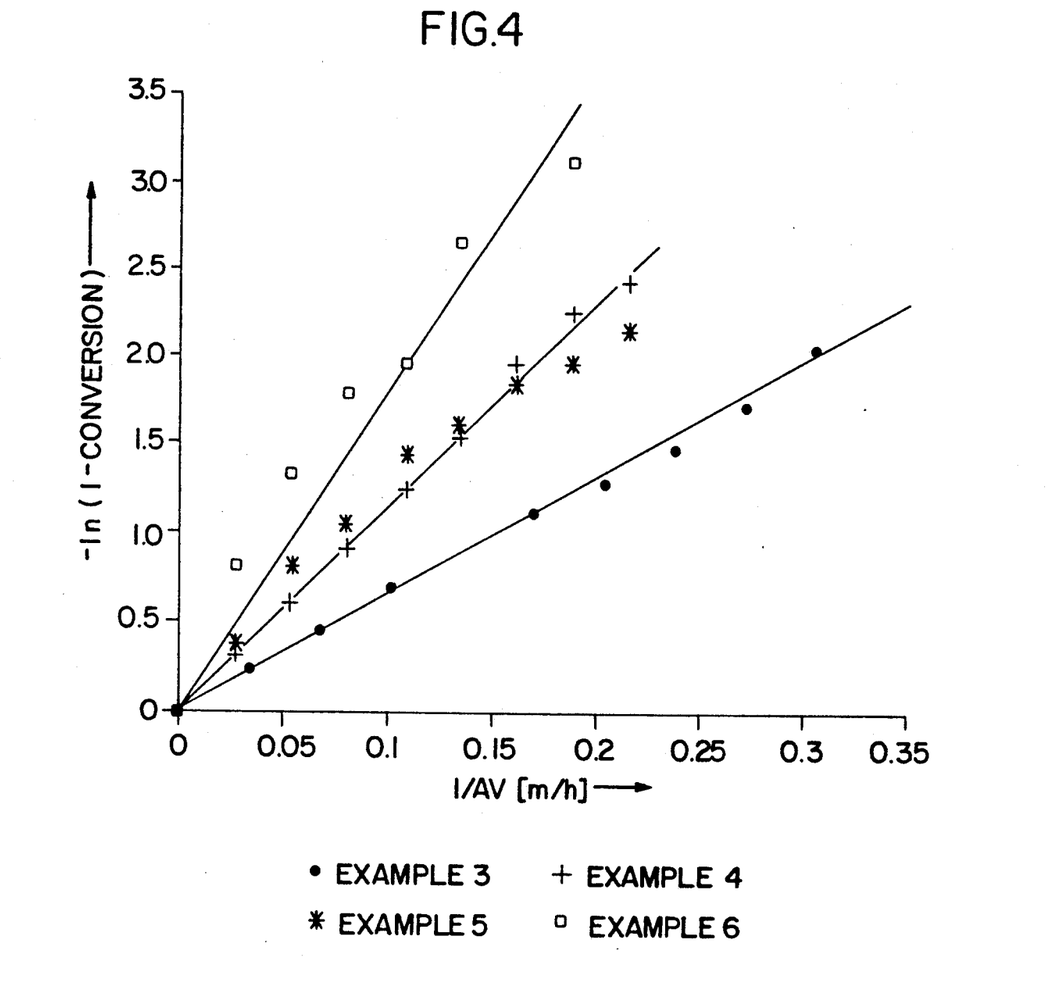
FIG. 4 shows a comparison of the natural log of $(1-SO_2$ conversion) as a function of $(AV)^{-1}$, for Examples 3-6 at 425° C.

FIGS. 3 and 4 show the evaluation of the measuring results on specimens from selected examples at 450° and 425° C., respectively. The application $-\ln(1-\eta)$ against $1/AV$ was selected in the sense of a reaction of the first order. The ordinate value of 2.3 corresponds to a conversion of 90%.

The results found thereby show that SO₂ conversions to SO₃ above 90% can be achieved without problems, such that the fixing at a minimum temperature of 450° C. necessary in the case of a noble-metal catalyst is no longer necessary, and that the kinetics of the SO₂ oxidation belong approximately to a time law of the first order.

The test specimens used in the industrial-size system were removed after a running time of more than 1000 operating hours and installed into the described pilot system for determination of activity. No reductions of activity were able to be determined.

EXAMPLES 7-10

The following substances were mixed in a kneading unit with blades which move out and subjected to a kneading process for 5 hours (all data in g):

TABLE 4

| Component | Example 7 | 8 | 9 | 10 |
|---|---|---|---|---|
| Titanium oxide (Pyrogenic) | 667 | 667 | 667 | 667 |
| Silicon dioxide | 70 | 70 | 70 | 70 |
| Ammonium Metavanadate | 37.1 | 37.1 | 37.1 | 37.1 |
| Potassium sulfate | 20.2 | 40.4 | 0 | 32.3 |
| Cesium sulfate | 20.2 | 0 | 40.4 | 8.1 |
| Water | 260 | 260 | 260 | 260 |
| Clay | 25.3 | 25.3 | 25.3 | 25.3 |
| Glass fibers | 72.4 | 72.4 | 72.4 | 72.4 |
| Customary organic additives including carboxymethyl cellulose | 15.7 | 15.7 | 15.7 | 15.7 |
| Ammonia | 30 | 30 | 30 | 30 |

After the kneading, the paste obtained is processed to extruded blanks. The drying and calcining again took place according to Example 1, but with a final temperature of the drying of 60° C. here and with a final moisture of 70% relative moisture. The temperature during calcining was increased here to only 500° C., and the matter was then sintered for 48 hours at this temperature.

Figure 5:
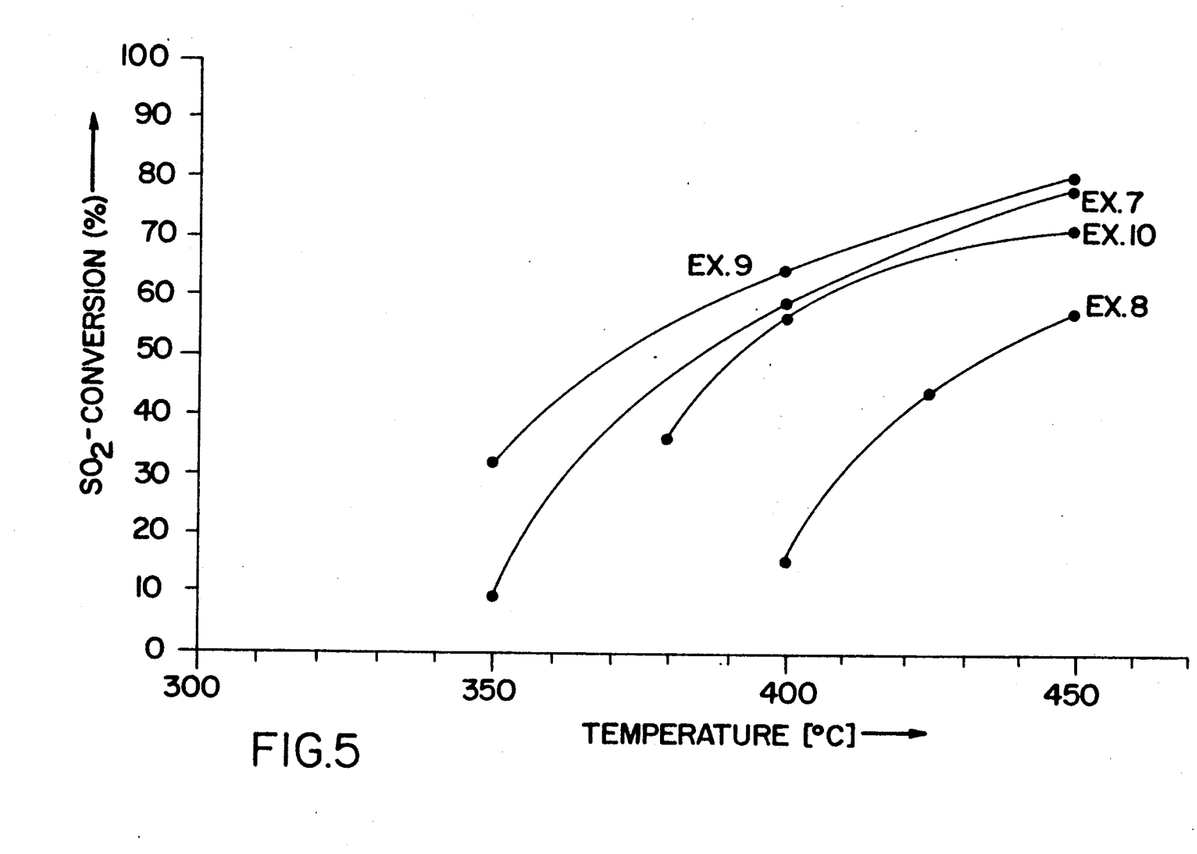
FIG. 5 shows the sulfur dioxide conversion rate as a function of temperature for Examples 7-10.

FIG. 5 shows the temperature-dependent activity behavior of the catalysts prepared in this manner under the testing conditions cited in Example 1, at a surface charge (AV) of 23 m/h.

EXAMPLES 11-15

The following substances were mixed in a kneading unit with blades which move out in a shearing manner and subjected to a kneading process for 5 hours (all data in g):

TABLE 5

| Component | Example 11 | 12 | 13 | 14 | 15 |
|---|---|---|---|---|---|
| Titanium oxide (80% by weight anatase + 20% by weight rutile) | 700 | 700 | 770 | 470 | 700 |
| Silicon dioxide (precipitated silica) | 70 | 70 | 2 | 300 | |
| Aluminum oxide ($\tau$-$Al_2O_3$) | | | | | 70 |
| Vanadium pentoxide | 7.5 | 130 | 42 | 42 | 42 |
| Potassium sulfate | 160.0 | 10 | 42 | 42 | 42 |
| Water | 300 | 250 | 220 | 300 | 300 |
| Clay | 30 | 25 | 25 | 25 | 25 |
| Glass fibers | 73 | 73 | 73 | 73 | 73 |
| Organic additives including carboxymethylcellulose | 17 | 17 | 17 | 17 | 17 |
| Ammonia | 50 | 50 | 50 | 50 | 50 |

The production of Examples 11-14 took place in a similar manner to Example 1. The produced catalysts met the basic values for the concentration ranges of the components $A_1$, $A_2$, B and C produced in accordance with this invention. It turned out that all production measures of the method in accordance with this invention, such as the kneading process, extrusion, drying, calcining, and sintering, can be readily carried out within this framework. Mechanically stable form bodies with an appropriate catalytic activity are obtained in every instance.

Example 11 showed that a catalyst composed in this manner exhibits an especially high activity even at low temperatures.

Example 15 showed that the co-use of $Al_2O_3$ also results in increased activity.

We claim:

1. A catalyst for the oxidation of sulfur dioxide contained in an oxygen-containing gas current, said catalyst comprising:
   $A_1$) Vanadium oxide;
   $A_2$) Alkali metal oxide, alkali metal sulfate or mixtures thereof, as a catalytically active substance;
   B) Silicon, aluminum or mixtures thereof, in the form of oxides, as a surface area enlarging component;
   wherein that the catalyst further includes:
   C) Titanium oxide in anatase form, rutile form or mixtures thereof, as a carrier material and a ceramic binder;
   said catalyst being a solid catalyst having catalytic active material through and through, wherein a mixture of the components A) through C) is present in a finely sintered form with atomic ratios between the metals of the components according to $A_1$):$A_2$):B):C) in the range of (0.01–0.2):(0.01–0.2):(0.001–0.5):1.

2. The catalyst according to claim 1, wherein the catalyst is in a monolithic or honeycomb form.

3. The catalyst according to claim 1, wherein the ratio of $A_1$):$A_2$):B):C) is in the range of (0.02–0.08):(0.02–0.08):(0.005–0.05):1.

4. A method for the production of a catalyst for the oxidation of sulfur dioxide contained in an oxygen-containing gas current, said catalyst comprising:
   $A_1$) Vanadium oxide;
   $A_2$) Alkali metal oxide, alkali metal sulfate or mixtures thereof, as a catalytically active substance;
   B) Silicon, aluminum or mixtures thereof, in the form of oxides, as a surface area enlarging component;
   wherein that the catalyst further includes:
   C) Titanium oxide in anatase form, rutile form or mixtures thereof, as a carrier material and a ceramic binder;
   said catalyst being a solid catalyst having catalytic active material through and through, wherein a mixture of the components A) through C) is present in a finely sintered form with atomic ratios between the metals of the components according to $A_1$):$A_2$):B):C) in the range of (0.01–0.2)(0.01–0.2):(0.001–0.5):1, said method comprising:
   intensively processing components A) through C) to a homogeneous mass in finely divided form;
   pressing or extruding the mass to a desired green body;
   drying the green body under a slow elevation of the temperature to at the most 60° C. with controlled moisture of the ambient air;
   calcining under gradual elevation of the temperature in the ambient air to the range of 500° C.-800° C.; and
   sintering at a temperature in this range for at least 12 hours.

5. The method according to claim 4, further including adding an additive to enhance pressing or extruding, said additive being at least one member chosen from the group of moistening agents, stabilizing medium, green-body binders, auxiliary deformation agents, and pore forming materials; said additive being added prior to pressing or extruding.

6. The method according to claim 4, wherein the temperature during the drying is elevated at the rate of about 1° C. per hour.

7. The method according to claim 4, wherein the temperature during calcining is elevated at the rate of no more than 50° C. per two hours.

8. The method according to claim 6, wherein the temperature during calcining is elevated at the rate of no more than 50° C. per two hours.

9. The method according to claim 4, wherein the catalyst is formed into a monolithic or honeycomb body.

10. The method according to claim 4, wherein the sintering takes place for 14 to 48 hours.

11. The method according to claim 10, wherein the sintering takes place for about 18-36 hours.

12. The catalyst according to claim 1, wherein the catalyst further includes glass fibers.

13. The catalyst according to claim 1, wherein the catalyst further includes at least one additive member selected from the group of a moistening agent, a stabilizing medium, a green-body binder, an auxiliary deformation agent, or a pore forming material.

14. The catalyst according to claim 1, wherein the catalyst further includes a cellulose derivative.

15. The catalyst according to claim 1, wherein the catalyst further includes a binder selected from the group consisting of cellulose derivatives, polyethylene, polypropylene, polyvinyl alcohol, polyethylene oxide, polyacrylamide, or polystyrene.

16. The method according to claim 5, wherein the additive is a stabilizing medium which includes glass fibers.

* * * * *